(12) United States Patent
Bellerive et al.

(10) Patent No.: US 9,645,475 B2
(45) Date of Patent: May 9, 2017

(54) ROTATABLE CAMERA SUPPORT

(71) Applicant: SPIVO INC., Ottawa, Ontario (CA)

(72) Inventors: Andre Bellerive, Ottawa (CA); Marc Bjerring, Ottawa (CA)

(73) Assignee: Spivo Inc., Ottawa (CA)

( * ) Notice: Subject to any disclaimer, the term of this patent is extended or adjusted under 35 U.S.C. 154(b) by 0 days.

(21) Appl. No.: 15/009,308

(22) Filed: Jan. 28, 2016

(65) Prior Publication Data

US 2016/0223886 A1 Aug. 4, 2016

Related U.S. Application Data

(60) Provisional application No. 62/109,278, filed on Jan. 29, 2015.

(51) Int. Cl.
*G03B 17/56* (2006.01)
*F16M 11/08* (2006.01)
*F16M 11/18* (2006.01)
*F16M 11/26* (2006.01)
*F16M 13/00* (2006.01)
*F16M 13/04* (2006.01)

(52) U.S. Cl.
CPC .......... *G03B 17/561* (2013.01); *F16M 11/08* (2013.01); *F16M 11/18* (2013.01); *F16M 11/26* (2013.01); *F16M 13/00* (2013.01); *F16M 13/04* (2013.01); *G03B 17/563* (2013.01)

(58) Field of Classification Search
USPC ....................................................... 396/420
See application file for complete search history.

(56) References Cited

U.S. PATENT DOCUMENTS

| | | | | |
|---|---|---|---|---|
| 5,065,249 A * | 11/1991 | Horn | ...................... | F16M 11/04 348/375 |
| 5,848,299 A * | 12/1998 | Shepper | ................. | G03B 17/08 396/29 |
| 6,354,750 B1 * | 3/2002 | Romanoff | .............. | G03B 17/00 248/183.2 |
| 7,204,650 B2 * | 4/2007 | Ghanouni | .............. | G03B 17/00 396/420 |
| 7,684,694 B2 * | 3/2010 | Fromm | ................... | F16M 11/14 396/376 |
| 7,755,668 B1 * | 7/2010 | Johnston | .............. | H04N 5/2251 348/148 |
| 7,931,412 B2 * | 4/2011 | Brown | ............... | F16M 11/2035 396/421 |
| 8,186,893 B1 * | 5/2012 | Patterson | ................ | B60R 11/04 396/428 |
| 2011/0108689 A1 * | 5/2011 | Dorris | .................... | F16M 11/04 248/221.12 |

* cited by examiner

*Primary Examiner* — Clayton E Laballe
*Assistant Examiner* — Linda B Smith
(74) *Attorney, Agent, or Firm* — Stetina Brunda Garred and Brucker

(57) ABSTRACT

A rotatable support apparatus for a camera is provided. The rotatable support apparatus comprises a support arm having a first end section and a second end section displaced from the first end section; an actuator positioned at the first end section of the support arm and capable of providing an actuating force or signal between the first end section and the second end section; and a support assembly positioned at the second end of the support arm and comprising a mount capable of supporting a camera and a rotational member adapted to translate the actuating force or signal from the actuator into rotational motion of the mount.

19 Claims, 9 Drawing Sheets

ROTATABLE CAMERA SUPPORT

CROSS-REFERENCE TO RELATED APPLICATIONS

The current application claims priority to U.S. Provisional Application No. 62/109,278, filed Jan. 29, 2015, and titled Rotatable Camera Support, which is incorporated herein by reference in its entirety.

STATEMENT RE: FEDERALLY SPONSORED RESEARCH/DEVELOPMENT

Not Applicable

FIELD OF INVENTION

The present invention relates generally to a support apparatus for a camera and/or imaging system. More specifically, the present invention relates to a rotatable support apparatus for a camera.

BACKGROUND

Action cameras, including those for capturing video and/or still photographs, are becoming increasingly popular consumer electronic devices. Action video cameras, such as those available from GoPro™, are now widely used devices for recording a variety of sports and recreational activities. Action cameras are commonly used to record action sports such as skiing, snowboarding, mountain biking, surfing, scuba diving, sky diving, and the like.

Action cameras are frequently operated by the subject of the film, meaning that the person capturing the video is also the person performing the activity to be filmed. Supporting devices have been developed to enable a user to capture "selfie" images or footage, unassisted by others. These supporting devices, sometimes referred to as "selfie sticks", are typically hand-held extension arms which are used to support a camera at a distance remote from, and pointing back toward, the user. The camera mount portions of these devices are typically manually adjustable, allowing the user to set the angle and direction of the camera, but generally not while the camera is in use. Some devices also provide built-in camera controls, allowing the user to operate camera functions remotely. Examples of camera supporting devices include those available from Gopole™ and Quikpod™.

U.S. Pat. No. 6,056,450 describes a camera support device including a control arm accessible by the operator. The camera support device allows a user to manually raise or lower the camera's field of view via operation of the control arm.

An additional, alternative, and/or improved camera mount is desirable.

BRIEF SUMMARY

In accordance with the present disclosure, there is provided a rotatable camera support comprising: a support arm member; an actuator located at a first end section of the support arm member providing a linear actuating force from the first end section toward a second end section of the support arm member; a support assembly positioned at the second end section of the support arm and comprising: a mount capable of supporting the camera; and a rotational member coupled to the mount and adapted to translate the linear actuating force into rotational motion of the mount.

In a further embodiment of the rotatable camera support, the mount is disengageably coupled to the rotational member to allow rotation of the mount in a single direction.

In a further embodiment of the rotatable camera support, the mount is disengageably coupled to the rotational member via a ratchet mechanism.

In a further embodiment of the rotatable camera support, the ratchet mechanism disengages the mount from the rotational member when the actuator resets between actuations to allow a linear force generated during the actuator reset to rotate the rotational member without rotating the mount.

In a further embodiment of the rotatable camera support, the mount is disengageably coupled to the rotational member via a friction clutch mechanism.

In a further embodiment of the rotatable camera support, the support assembly further comprises a rotational assist device capable of providing a supplemental rotational force to the mount.

In a further embodiment of the rotatable camera support, the rotational assist device comprises a cam profile located on the mount and a follower mechanism in contact with the cam profile, the follower mechanism urging rotation of the cam profile from a high point of the cam profile to a low point of the cam profile.

In a further embodiment of the rotatable camera support, the cam profile provides two or more preset positions through which the mount can be rotated, with each of the preset positions associated with a high point and corresponding low point of the cam profile.

In a further embodiment of the rotatable camera support, the two or more preset positions of the cam profile are equally distributed about a 360° rotation of the mount.

The rotatable camera support according to claim 8, wherein the two or more preset positions of the cam profile are unequally distributed about a 360° rotation of the mount.

In a further embodiment of the rotatable camera support, the mount rotates about 180° per actuation of the actuator.

In a further embodiment of the rotatable camera support, the mount rotates between a first stop position substantially facing the first end of the support arm, and a second stop position about 180° from the first stop position.

In a further embodiment of the rotatable camera support, the second end section of the support arm member is displaced from the first end section along a longitudinal axis, and the rotational motion of the mount is within a plane which the longitudinal axis of the support arm member lies in.

In a further embodiment of the rotatable camera support, the actuator and rotational member comprise a rack and pinion mechanism for translating the actuating force from the actuator into the rotational motion of the mount.

In a further embodiment of the rotatable camera support, the actuator comprises a spring-loaded trigger.

In a further embodiment of the rotatable camera support, the actuator comprises a rod, pulley, cable, chain, rope, string, or belt for providing the actuating force to the rotational member.

In a further embodiment of the rotatable camera support, the actuator comprises a rod for providing the actuating force to the rotational member.

In a further embodiment of the rotatable camera support, the mount comprises a mounting screw for mounting a camera.

In a further embodiment of the rotatable camera support, the support arm further comprises a hand grip at the first end section of the support arm.

In accordance with the present disclosure there is further provided a rotatable camera support kit, comprising: an actuator for installation at a first end section of the support arm member providing a linear actuating force from the first end section toward a second end section of the support arm member; and a support assembly for installation at the second end section of the support arm and comprising: a mount capable of supporting the camera; and a rotational member coupled to the mount and adapted to translate the linear actuating force into rotational motion of the mount.

In a further embodiment, the rotatable camera support kit further comprises the support arm member.

In a further embodiment of the rotatable camera support kit, the actuating force is a linear force provided along a longitudinal axis of the support arm.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
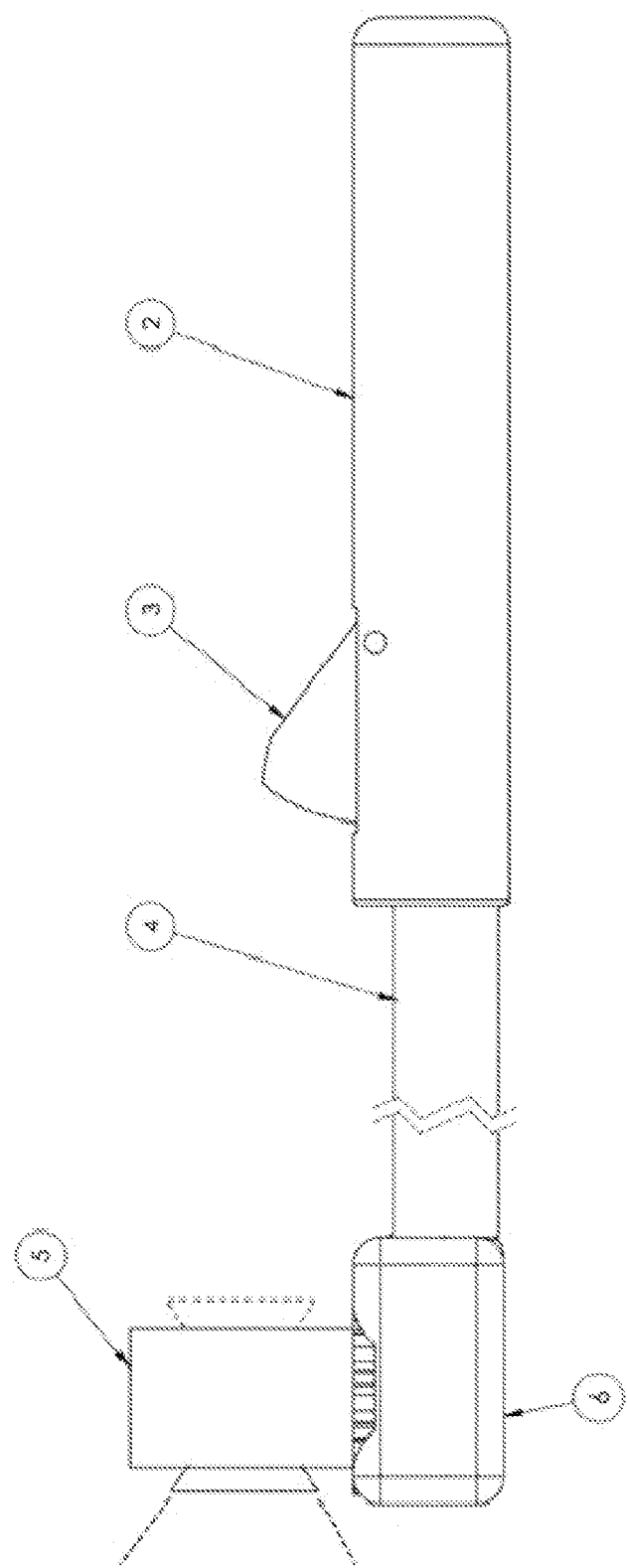
FIG. 1 shows a perspective view of an embodiment of a rotatable support apparatus for a camera.

A rotatable camera support allows a camera, or other imaging device, to be fixed to a support assembly that can be rotated by an actuator located away from the camera. As described further below, the actuator may be a mechanical actuator that allows the camera to be rotated between different positions with subsequent activation(s) of the actuator. Although other applications are envisioned, the rotatable support apparatus is described with regard to a support for a camera that allows the focus direction of the camera to be rotated a particular amount, such as 180°, with each depression of a thumb trigger actuator. The rotation allows the focus direction of the camera to be changed, even while the camera remains in use. As described in further detail below, each activation of the actuator causes the camera to rotate in the same direction, however, returning the actuator to the initial position may not cause the camera to rotate in the reverse direction.

A rotatable support apparatus may, in some embodiments, be a hand-held apparatus comprising a support arm, an actuator positioned toward a first end section of the support arm, and a support assembly positioned toward a second end section of the support arm. The rotatable support apparatus may be adapted to hold a camera at the support assembly, and may be configured to be supported or held by a user at the end having the actuator, or attached to another structure. During use, a user may trigger the actuator, which results in rotation of the camera such that the camera's field of view is changed, for example from pointing toward the user to pointing away from the user. It will be appreciated that rotatable support apparatuses described herein are for illustrative purposes intended for those skilled in the art, and are not meant to be limiting in any way.

As will be understood, a camera as referred to herein may be any imaging device or imaging system for capturing photographs and/or video. Cameras may include any suitable devices for taking photographs, for capturing video, or devices which are capable of both video and photo capture. Embodiments of cameras may include GoPro™ cameras, camera-equipped cell phones, action cameras, digital cameras, film cameras, digital video cameras, disposable cameras, waterproof cameras, shock-resistant cameras, night-vision equipped cameras, 1080p HD cameras, 4K cameras, 3D cameras or the like.

A support arm as referred to herein may be any suitable structure for providing a separation between a user and a camera being used. A support arm may be a structure having a first end section, and a second end section displaced from the first end section. As referred to herein, first and second end sections may be portions of the support arm which are located at or near first and second ends of the support arm. First and second end sections may include the first and second ends of the support arm, and/or sections of the support arm in the vicinity of the first and second ends.

In some embodiments, the support arm may comprise first and second ends separated by a length along a longitudinal axis extending therebetween, such as a stick, pole, tube, pipe, or the like. The support arm may, in certain embodiments, have one or more curves, bends, contours, or elbows between the first and second ends, as desired.

The support arm may have a hollow core. Support arms may be made of metal, plastic, a polymer, or any other suitable material known in the art that provides sufficient strength to support a camera at one end. In certain embodiments, support arms may be lightweight to allow for hand-held use, optionally one-handed use, and/or easy maneuverability during operation. Support arms may be manufactured to be durable, such that they may be at least partially resistant to wear and/or breakage during use, either through rigidity or flexibility characteristics of the structure and/or fabrication material. Support arms may, in some embodiments, be weather resistant, and/or may be suitable to function in wet or underwater environments such as lakes, pools, or oceans. The circumference or outer perimeter of the support arm may have at least one portion which may be sized to allow for grasping in a hand. The support arm may optionally be collapsible, extendable, foldable, telescoping, designed for easy disassembly and reassembly for transport, or a combination thereof. The support may optionally be extendable and retractable, such that the distance from the user to the camera can be increased or decreased.

It will be understood that the rotatable support apparatus, optionally via the support arm, may, in certain embodiments, be mountable to another structure. The support arm may be mounted to, for example, a bicycle, ATV, or motorcycle handlebar.

An actuator as referred to herein may refer to any suitable actuator or trigger mechanism or device which is capable of being actuated by a user to provide an actuating force or signal between the first end section and the second end section of the support arm. Suitable actuators may comprise any suitable switch, trigger, lever, twist knob, slide (forward-backward, or left-right), pressure activated, or button mechanism. In some embodiments, the actuator may be positioned on the support arm near a user's thumb, finger, wrist, or palm. In certain embodiments, the actuator may be spring-loaded or otherwise configured such that the actuator resets, that is returns to an initial position to allow activation, after being actuated. The actuator may be configured to be operated one-handed or two-handed, may be operated by a user's thumb, finger, palm, or any combination thereof, or by any other suitable method. The actuator may be configured to be actuated by rotation, pressing, pushing, pulling, twisting, squeezing, gripping, or other application of force by a user. In an additional embodiment, the actuator may be electronic, such that triggering of a sensor (pressure sensor, touch-sensor, or the like) or button actuates the actuator to generate/transmit an actuating signal.

It will be understood that in embodiments where the rotatable support apparatus, optionally via the support arm, is mounted to another structure, the actuator may optionally be mountable on said other structure. The actuator may be mounted to, for example, a bicycle, ATV, or motorcycle handlebar to which a support arm is mounted.

Actuation of the actuator may result, either directly or indirectly, in an actuating force or actuating signal being transmitted between the first end section and the second end section of the support arm. An actuating force or actuating signal may be any force, signal, or energy directed between the first end section and the second end section of the support arm which can be received by a support assembly. In certain embodiments, the actuator may comprise a cable, chain, rod, string, rope, belt, shaft, pulley, gear system, wired (electrical) connection (i.e. for generating an actuating signal), wireless connection (i.e. for generating an actuating signal, for example a Bluetooth or WiFi connection), power screw, hydraulic, other structural linkage, or a combination thereof, which is configured to transmit the actuating force or signal generated, as a result of triggering the actuator, to a support assembly. In an embodiment, a rod may be used to transmit the actuating force. In an additional embodiment, the actuating force may be transmitted along the support arm through an internal passage of the support arm. The support arm may be hollow, and a rod or other structural element may extend through the hollow portion from the actuator trigger towards a support assembly. Alternatively, the actuating force may be transmitted along an exterior of the support arm. The actuating force may be transmitted along the support arm, and may follow bends or contours in the support arm. The actuating force may, in other examples, be transmitted between the first end section and the second end section of the support arm along a path which does not follow the path of the support arm. In embodiments where the second end section of the support arm is displaced from the first end section of the support arm along a longitudinal axis, the actuating force may be a linear force provided along the longitudinal axis of the support arm.

A support assembly as referred to herein may be any suitable support assembly which comprises a mount for mounting a camera, and a rotational member coupled to the mount and adapted to translate the actuating force from the actuator into rotational motion of the mount. The mount may be any suitable camera mount or camera stabilizer. Suitable mounts may include those having a mounting screw to which a camera may be attached, or those having a clamp, claw, grip, tie, buckle mount, or friction fitting for securing a camera. The rotational member may be any suitable mechanism for translating actuating force or signal from the actuator into rotational motion of the mount. Suitable rotational members may include those having a rack and pinion mechanism, a pulley mechanism, a gear mechanism, a bevel gear mechanism, a U-joint mechanism, a lever mechanism, or other linkage mechanism which can cause rotation of the mount in response to an actuating force or signal from the actuator.

As will be understood, the rotational motion of the mount will result in a change of the field of view of a camera installed on the mount. In certain embodiments, a rotation axis of the mount may be substantially perpendicular to a longitudinal axis of the support arm.

In an embodiment, the mount may be disengageably coupled to the rotational member, so as to allow rotation of the mount in a single direction. It will be understood that rotation of the mount in both directions may also be possible and rotation of the mount in a single direction is only one possible embodiment. The disengageable coupling of the mount to the rotational member may refer to a coupling wherein rotational motion of the rotational member in a first direction may engage the mount, causing rotation of the mount with the rotational member, while rotational motion of the rotational member in a second (i.e. opposite) direction may not cause rotation of the mount due to disengagement of the rotational member from the mount. The disengageable coupling may allow the rotational member to reset, or return to a previous position, for subsequent rotation(s) of the mount as triggered by the actuation of the actuator. In this manner, the actuator and rotational member, and the coupling therebetween, may automatically reset between actuations without further user intervention or input, while allowing the mount to remain in the same position. The mount may be disengageably coupled to the rotational member via a ratchet-type mechanism, a clutch-type mechanism, a friction clutch-type mechanism, or any other suitable mechanism for disengageable coupling.

A rotational assist device as referred to herein may include any device which is suitable for providing rotational motion to the mount beyond that which is provided from actuation of the actuator. The rotational assist device may, in some embodiments, allow for more rotation of the mount than is provided by the actuator. In further embodiments, the actuator may be configured to provide only a small amount of actuating force, and rotational motion of the mount may be supplemented with additional rotational motion provided from the rotational assist device. Such a design may allow for the actuator to trigger significant rotation of the mount with reduced or very little manual input from the user. For example, only a short trigger pull on the actuator may produce significant rotational motion of the mount. Examples of suitable rotational assist devices may include those having a cam and follower mechanism, a detent mechanism, a stepper motor mechanism, a crankshaft and linkage mechanism, a magnet-based mechanism, or another suitable linkage and/or spring mechanism. In certain embodiments, the rotational assist device may comprise a cam profile located on the mount, having an associated spring-loaded follower component, and actuation of the actuator may bring the follower to a position just beyond an apex of the cam profile such that the spring-loaded follower will provide additional rotational motion (i.e. via applying force to the cam profile) to the mount as the follower returns to a trough of the cam profile. In another embodiment, magnets may be arranged on and/or around the mount, such that actuation of the actuator may result in enough rotation of the mount to magnetically draw the mount through further rotational motion until a subsequent preset or stop position is reached.

It will be understood that preset positions and stop positions as described herein may refer to predetermined rotational positions of the mount at which the mount may come to a rest following rotation triggered by actuation of the actuator. By way of example, stop positions may include a position at which a mounted camera is aimed at a user, and a position at which a mounted camera is aimed away from (i.e. about 180° away from) a user. In embodiments where a rotational assist device is used, the rotational assist device may provide the mount with enough supplemental rotational motion to allow the mount to pass between preset or stop positions without substantially stopping at positions therebetween. The rotational assist device may be adjusted to have several different and/or adjustable preset or stop positions. The rotational assist device may optionally be configured such that it can be activated or deactivated as needed. In some examples, when the rotational assist device comprises a cam profile and follower mechanism, preset or stop positions may, be defined as troughs or valleys along the cam profile. In addition to providing additional rotational motion to the mount, the rotational assist device may also provide a locking force to the mount to prevent or retard further rotation of the mount from the preset positions until the locking force is overcome by the linear force transmitted by the actuator.

A hand grip as referred to herein may be any suitable hand grip for enhancing a user's grasp of the rotatable support apparatus. The hand grip may increase friction or grip between the user's hand and the rotatable support apparatus, may protect the rotatable support apparatus from damage, may be formed or molded to a user's hand, may exaggerate or pronounce a portion of the actuator such that it can be actuated by a gloved hand or a hand wearing a mitten, and/or may be interchangeable, customizable, insulated, heated, or otherwise modified depending on the environment of the user.

Embodiments of a rotatable support apparatus for a camera is described in further detail below with reference to FIGS. 1 to 9. One or more illustrative embodiments have been described below by way of example. As will be apparent to persons skilled in the art having regard to the teachings herein, a number of variations and modifications can be made to the described rotatable support apparatus without departing from the current teachings.

FIG. 1 illustrates a hand-held rotatable support apparatus (1) for a camera. The hand-held rotatable support apparatus comprises a support arm (4) having a first end section and a second end section displaced from the first end along a longitudinal axis, an actuator (3) substantially positioned at the first end section of the support arm and capable of providing an actuating force, in this case a linear force, between the first end section and the second end section, in this case along the longitudinal axis of the support arm, a hand grip (2) for a user to hold, and a support assembly (6) positioned at the second end section of the support arm and comprising a mount capable of supporting a camera and a rotational member adapted to translate the actuating force from the actuator into rotational motion of the mount. In the illustration, a camera (5) has been installed.

As illustrated in FIG. 1, the actuator (3) comprises a trigger positioned for operation by a user's thumb, the support arm (4) is a hollow pole, and the actuating force is transmitted along the support arm through the hollow section of the pole. As shown, the camera can be pointed in a first direction away from a user (shown), and upon actuation of the actuator (3) the camera can be rotated about 180° to face the user (represented by dashed lines). As shown, the actuator (except a portion of the trigger which is accessible to the user) and the support assembly (except a portion of the mount, which is accessible to the user for camera attachment) may be enclosed as shown in the illustrated embodiment.

As illustrated in FIG. 1, the user can quickly and easily rotate the camera between a position facing the user, and a position facing away from the user at will via actuation of the actuator. If the device is held by a user such that the support arm (4) is parallel to the floor, and the camera is upright (i.e. above the support assembly (6)), then the axis of rotation of the camera depicted in FIG. 1 is substantially perpendicular to the plane of the floor. In other words, with regard to the orientation depicted in FIG. 1, the camera may rotate about a rotational axis which is substantially vertical. The rotational motion of the mount will be within a plane which is substantially parallel to the longitudinal axis of the support arm. The rotation of the mount within a plane substantially parallel to the longitudinal axis of the support arm allows the direction of the camera's field of view to be changed without inverting the scene captured by the camera.

FIG. 2 illustrates embodiments of possible communication arrangements between the actuator (3) and the support assembly (6) as shown in, for example, the rotatable support apparatus (1) of FIG. 1. FIG. 2(A), a cross-sectional side view, illustrates an actuating force generated by actuation of actuator (3), which is represented by a linear double headed arrow in the drawing. As shown, the actuating force may be directed between the first end section and the second end section of the support arm along the longitudinal axis of support arm (4). At the rotational member (22), which may be disengageably coupled to mount (23), the actuating force may be translated into rotational force, which may rotate the mount (represented by the rounded double-headed arrow). Actuation of the actuator may produce an actuating force directed away from the support assembly (6) (directly or indirectly "pulling" on the rotational member), or an actuating force directed toward the support assembly (6) (directly or indirectly "pushing" on the rotational member), depending on configuration of the actuator. Resetting of the actuator after actuation may result in an equal, but opposite force being applied to the rotational member. If the mount is disengageably coupled to the rotational member, the opposite force resulting from the resetting of the actuator is not translated into rotational motion of the mount.

In an embodiment, the rotational member (22) may be configured to rotate the mount in a first rotation direction (i.e. either clockwise or counter clockwise) in response to an actuating force in a first direction (i.e. either a "push" or a "pull" at the support assembly), and to rotate the mount in a second rotation direction (opposite the first rotation direction) in response to an actuating force in a second direction (opposite the first direction). The actuator (3) may be configured to generate the actuating force in the first direction (i.e. either a "push" or a "pull" at the support assembly) upon actuation by the user, and the actuating force in the second direction (opposite the first direction) upon release of the actuator by the user.

In an alternative embodiment, the rotational member (22) may be configured to rotate the mount in a rotational direction (i.e. either clockwise or counter clockwise) in response to an actuating force in a first direction (i.e. either a "push" or a "pull" at the support assembly), and the rotational member (22) may reset in response to an actuating force in a second direction (opposite the first direction) without rotating the mount. The rotational member (22) may be disengageably coupled to the mount (23), such that the rotational member engages the mount and rotates the mount in a rotational direction (i.e. either clockwise or counter clockwise) in response to an actuating force in a first direction (i.e. either a "push" or a "pull" at the support assembly), and disengages the mount and moves to a reset position in response to an actuating force in a second direction (opposite the first direction) without rotating the mount. In this manner, the actuator and rotational member, and the coupling therebetween, may automatically reset between actuations without further user intervention or input. As previously discussed, the actuator (3) may be configured to generate the actuating force in the first direction (i.e. either a "push" or a "pull" at the support assembly) upon actuation by the user, and the actuating force in the second direction (opposite the first direction) upon release of the actuator by the user.

Figure 2A:
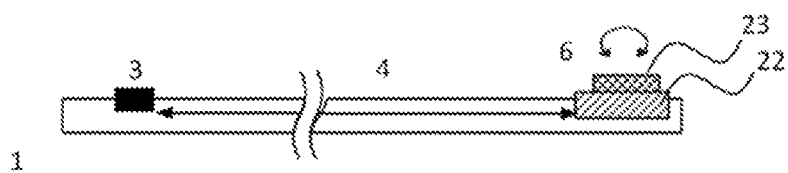
FIGS. 2A-2F show embodiments of possible communication arrangements between the actuator and the support assembly of a rotatable support apparatus for a camera.
Figure 2B:
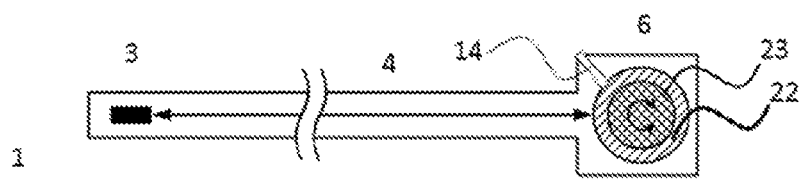

FIG. 2(B) illustrates a further embodiment of the rotatable support apparatus (1) shown in FIG. 2(A) as discussed above, which further includes a rotational assist device (14) as part of the support assembly (6). In the illustrated embodiment, the rotational member (22) may be disengageably coupled to the mount (23), such that the rotational member engages the mount and rotates the mount in a rotational direction (i.e. either clockwise or counter clockwise) in response to an actuating force in a first direction (i.e. either a "push" or a "pull" at the support assembly). The rotational assist device (14) may then provide additional rotational motion to the mount (23) in the same rotation direction, causing the mount to continue to rotate (now disengaged from the rotational member (22)), resulting in rotation of the mount by more than it otherwise would have without contribution from the rotational assist device. As outlined previously, the rotational member (22) may disengage from the mount and move to a reset position in response to an actuating force in a second direction (opposite the first direction), without rotating the mount. Also as previously discussed, the actuator (3) may be configured to generate the actuating force in the first direction (i.e. either a "push" or a "pull" at the support assembly) upon actuation by the user, and the actuating force in the second direction (opposite the first direction) upon release of the actuator by the user.

Figure 2C:
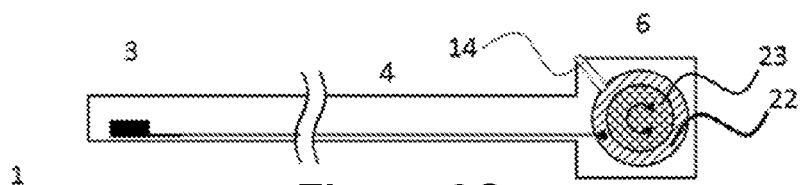
Figure 2D:
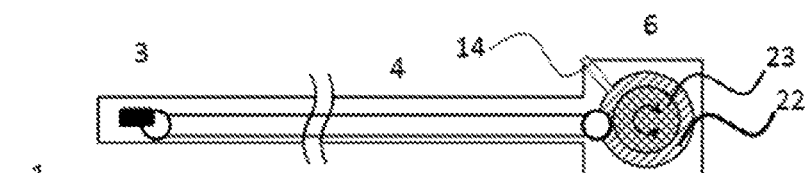
Figure 2E:
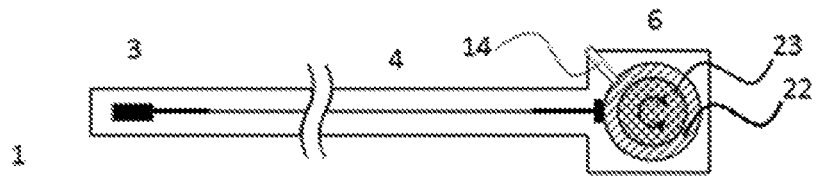
Figure 2F:
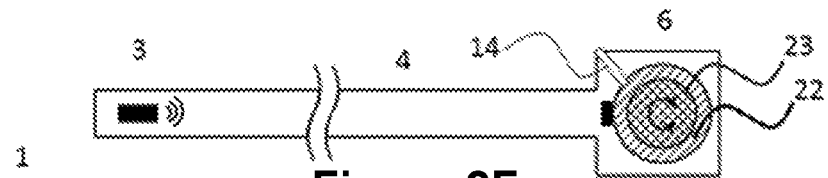

FIG. 2(C) illustrates an embodiment where the actuator comprises a rod joining the actuator trigger to the rotational member (22). FIG. 2(D) illustrates an embodiment where the actuator comprises a cable, string, chain, belt, or rope-based pulley system joining the actuator trigger to the rotational member (22) for providing the actuating force. FIG. 2E illustrates an embodiment where the actuator comprises a wired connection to the rotational member (22) for providing the actuating signal. FIG. 2F illustrates an embodiment where the actuator comprises a wireless link to the rotational member (22) for providing the actuating signal.

It will be understood by the person of skill in the art that embodiments having a disengageable coupling between the rotational member and the mount have been described above and in further detail in the following discussions. It will be recognized that several other variations, substitutions, additions, and alternative arrangements may be possible. For example, certain embodiments, such as that shown in FIG. 2(D), may be modified to comprise a disengageable coupling between the actuator trigger and the connecting structure (i.e. the pulley and cable system in this case) that transmits the actuating force to the support assembly, which may allow the actuator trigger to reset without generating actuating force on the rotational member. This disengageable coupling may, in some embodiments, be in addition to the disengageable coupling between the rotational member and the mount. The person of skill in the art will understand that several alternative arrangements and variations may be possible without departing from the scope of this disclosure.

Figure 3:
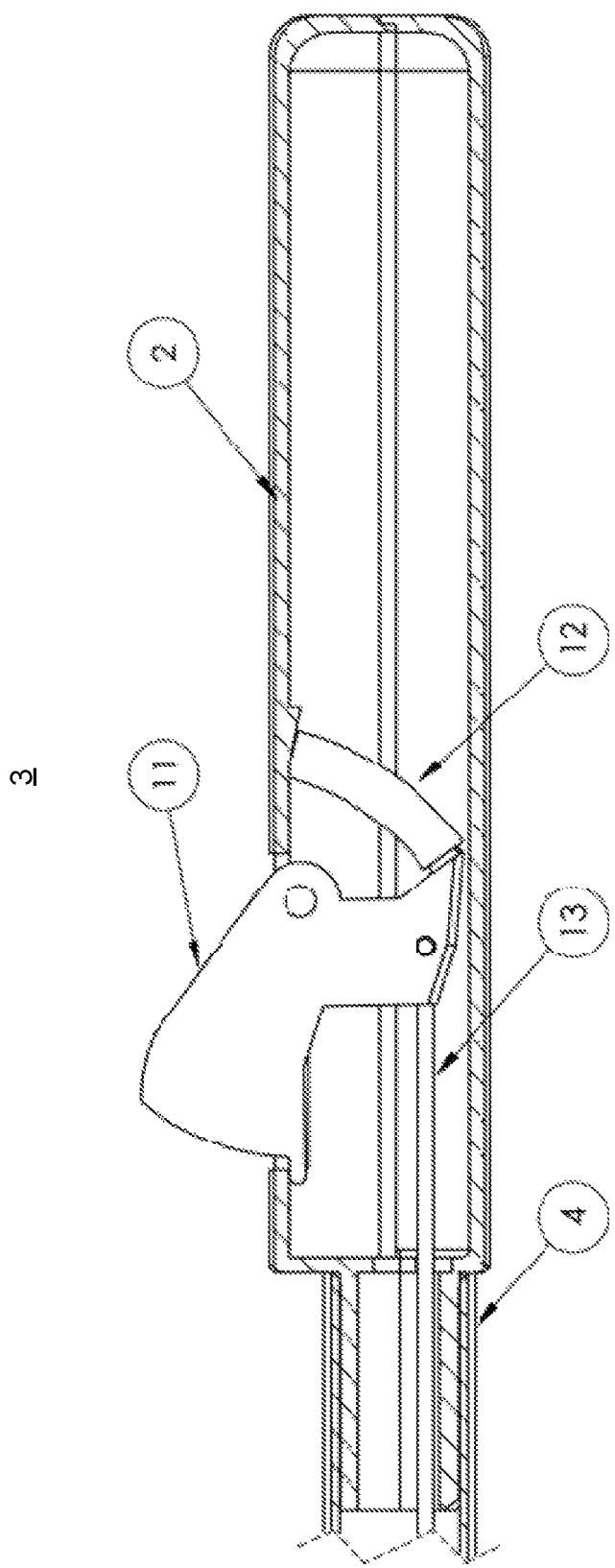
FIG. 3 shows cross-sectional view of one embodiment of an actuator for a rotatable support apparatus for a camera.

FIG. 3 illustrates a cross-sectional view of an embodiment of an actuator (3). The actuator represents an example of an actuator which may be installed in a rotatable support apparatus such as that illustrated in FIG. 1. The illustrated actuator embodiment is a trigger-type actuator, which is positioned to be operated by a user's thumb. Pressing the actuator trigger (11) will transmit actuating force, in this case along the longitudinal axis of the support arm (4), via a rod (13), which is pulled toward the user upon pressing the trigger (11). While the rod is pulled in the illustrated embodiment, it will be understood that the reverse push-pull situation may also be possible. Depressing the trigger also loads the spring element (12), such that upon release of the trigger the pre-loaded spring element (12) will reset the trigger (i.e. back to the "up" position), pushing the rod away from the user and back to the initial pre-actuation position.

It will be understood that a spring or spring element as referred to herein may be any suitable structure which is able to store (i.e. become pre-loaded) and release mechanical energy. A spring may be, for example, a helical or coil spring, or an elastic or resilient element which may be deformed (storing mechanical energy; pre-loading) and restored (releasing stored mechanical energy), such as the spring element (12) shown in FIG. 3.

Figure 4:
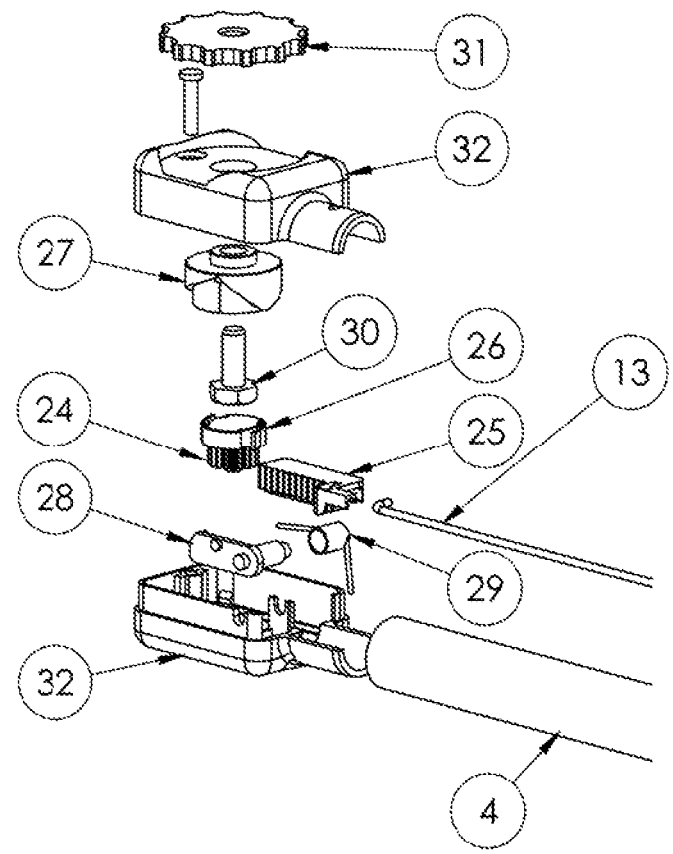
FIG. 4 shows an exploded view of one embodiment of a support assembly comprising a rotational member which is disengageably coupled to a mount via a ratchet mechanism, and a rotational assist device.

FIG. 4 illustrates an exploded view of one embodiment of a support assembly (6), which includes an example of a support assembly (6) which may be installed in a rotatable support apparatus (1) such as that outlined in FIG. 1. The illustrated support assembly comprises a housing assembly (32), into which is installed a rotational member comprising a pinion (24). The rod (13) from the actuator is attached to a rack (25) which is engaged with the pinion. To the pinion is attached a ratchet mechanism (26), which is disengageably coupled with a mount comprising a mounting screw (30) and a thumb tightening nut (31) through a rotational assist device comprising a cam profile (27) and a follower (28) with an associated spring (29). It will be understood that the ratchet mechanism may be any suitable ratchet mechanism known in the art, such as a ratchet mechanism comprising one or more resilient or flexible members which engage when rotated in one direction, and disengage (e.g., via flexing or otherwise bending) when rotated in another direction.

In the illustrated embodiment of FIG. 4, the ratchet mechanism (26) is configured such that only clockwise rotation of the rotational member will engage the mount to rotate. In the illustrated embodiment, counter clockwise rotation of the rotational member does not engage the mount to rotate, which allows the actuator/rotational member mechanism to reset to pre-actuation position following actuation and release of the actuator (i.e. when the trigger (11) shown in FIG. 3 is released by the user). The person of skill in the art will recognize that the rotational directions (clockwise, counter clockwise) may be reversed in other embodiments.

Figure 5:
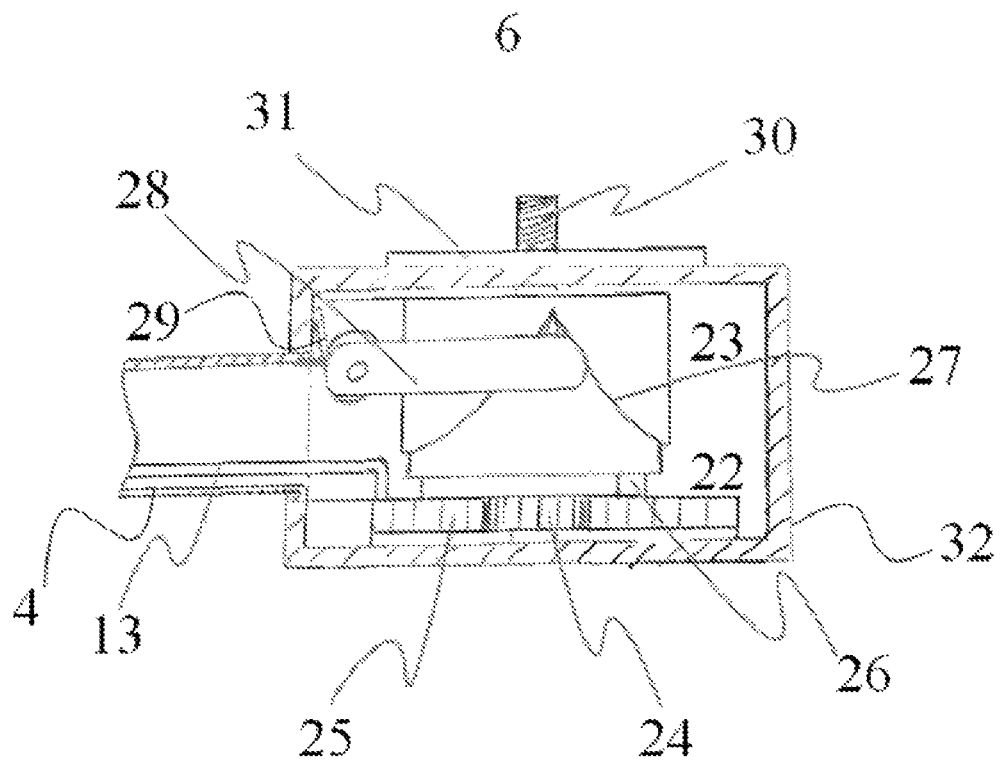
FIG. 5 shows a cross-sectional view of one embodiment of a support assembly comprising a rotational assist device and a ratchet mechanism.

FIG. 5 illustrates a cross-sectional view of an embodiment of a support assembly (6) which represents an example of a support assembly which may be installed in a rotatable support apparatus (1) such as that outlined in FIG. 1. The embodiment of the support assembly (6) comprises a mount (23) capable of supporting a camera and a rotational member (22) adapted to translate actuating force from the actuator (3), for example the actuator as shown in FIG. 3, into rotational motion of the mount (23). The actuator (3) comprises a rack (25) attached to the rod (13), and the rotational member (22) comprises a pinion (24) engaged with the rack, such that actuating force, in this example linear force, from the rod (13), via rack (25), rotates the pinion (24). Pushing trigger (11) of FIG. 3 will pull rod (13) toward a user, and pulling of rod (13) in the support assembly (6) shown in FIG. 3 will result in a counter clockwise rotation of the pinion when viewed from the side facing the mount (23) (i.e. the top). Releasing trigger (11) of FIG. 3 will push rod (13) away from the user, and pushing of rod (13) in the support assembly (6) shown in FIG. 5 will result in a clockwise rotation (when viewed from the top side, looking down at mount (23)) of the pinion.

The mount (23) shown in FIG. 5 is disengageably coupled to the rotational member (22) via a ratchet mechanism (26), such that only counter clockwise rotation of the pinion (when viewed from the side facing the mount (23)) will engage the mount (23) to rotate. Clockwise rotation of the pinion does not engage the mount (23), which allows the rod/rack/pinion mechanism to reset to pre-actuation position following actuation of the actuator and upon release of the trigger (i.e. when the trigger (11) shown in FIG. 3 is released by the user).

In the embodiment shown in FIG. 1, the support arm comprises an optional hand grip (2) at the first end. In the embodiment shown in FIG. 5, the mount further comprises a mounting screw (30) for mounting a camera. The camera may be attached to the mounting screw (30), and fastened in place (i.e. via a friction fit) by an optional thumb tightened nut (31). The mounting screw (30) may, in some embodiments, be a standard tripod screw.

In the embodiment shown in FIG. 5, support assembly (6) further comprises a rotational assist device. In the illustrated embodiment, the rotational assist device comprises a cam profile (27) located on mount (23), and a follower (28) which is engaged with the cam profile (27). The follower (28) includes a spring (29). In the preset/stop position shown in FIG. 5, mount (23) is rotated to a first stop position, with the follower being in a trough in the cam profile (27). When the pinion (24) is rotated clockwise (i.e. by pressing the trigger shown in FIG. 3), the ratchet (26) is engaged, and the mount (23) rotates clockwise. As the mount (23) rotates, the follower moves towards an apex of the cam profile (27) (i.e. the rise interval), which gradually increases the load on spring (29). In the illustrated embodiment, pressing trigger (11) pulls the rod a distance which rotates pinion (24) a sufficient amount to rotate the mount (23) a sufficient amount to move the follower (28) just beyond an apex of the cam profile (27). Once beyond the apex, the load on spring (29) provides force, via the follower (28) pressing against the cam profile (27), to rotate the mount (23) until the follower (28) has once again reached a trough in cam profile (27). In this manner, the rotational assist device provides rotational motion to the mount (23) which is in addition to that provided by the actuator. The rotational assist device can, in some embodiments, provide significant rotational motion from comparatively minor actuating force/actuator input. As well, in some embodiments the cam and follower mechanism can provide a substantially vibration free, strong hold on the cam profile and mount.

In some embodiments, the cam profile (27) may include equally spaced apart troughs. In additional embodiments, the troughs may be separated from one another by apexes in the cam profile which may occur about half-way between the troughs, or which may occur at unequal distributions between troughs. For example, in one embodiment a first and a second trough may be spaced about 180° apart, and an apex may occur at about 60° from the first trough and about 120° from the second trough. The cam profile moving from trough to apex to trough may be smooth and gradual, or more steep. It will be recognized that the cam profile can be adjusted as desired to provide suitable rotational assistance to the camera mount as desired by the user, or as is suitable for the particular filming application.

Once the apex is passed, the trigger (11) can be released, pushing the rod (13) and rack (25) to a pre-actuation state, which rotates the pinion (24) clockwise to a pre-actuation state without substantially rotating the mount (23) since the ratchet mechanism (26) is disengaged during clockwise rotation of the pinion, resulting in a reset of the actuator such that the system is ready for further actuation/rotation events.

In the embodiment illustrated in FIG. 5, preset/stop positions of the mount (23) correspond to troughs in cam profile (27). Cam profile troughs may be incorporated into the cam profile such that two or more preset/stop positions through which the mount can be rotated are provided. In a further embodiment, the two or more preset positions of the cam profile may be equally distributed about a 360° rotation of the mount. In yet another embodiment, the rotational assist device (e.g. via the cam profile or via magnet placement around the mount) may guide rotation of the mount by about 180° per actuation of the actuator. In certain embodiments, the mount may rotate between a first stop position substantially facing the first end of the support arm, and a second stop position about 180° from the first stop position.

As depicted in FIG. 5, the support assembly (6) may include a housing (32) enclosing, or at least partially enclosing, the rotational member, mount, and rotational assist device. In addition to providing a structure for mounting components, the housing (32) may provide the components protection from the elements, from physical damage, and/or from water during underwater use. The housing (32) may be manufactured in numerous ways. For example, the housing may be provided by a two-piece housing. During assembly of the rotatable support apparatus, the rotational member, mount and any other components may be assembled within a first half of the housing. Once assembled the second half of the housing may be connected or affixed to secure the components in place. The housing allows the mount, or a portion of the mount such as a connecting screw to protrude out of the housing to allow the camera to be secured to the rotatable support apparatus.

Figure 6A:
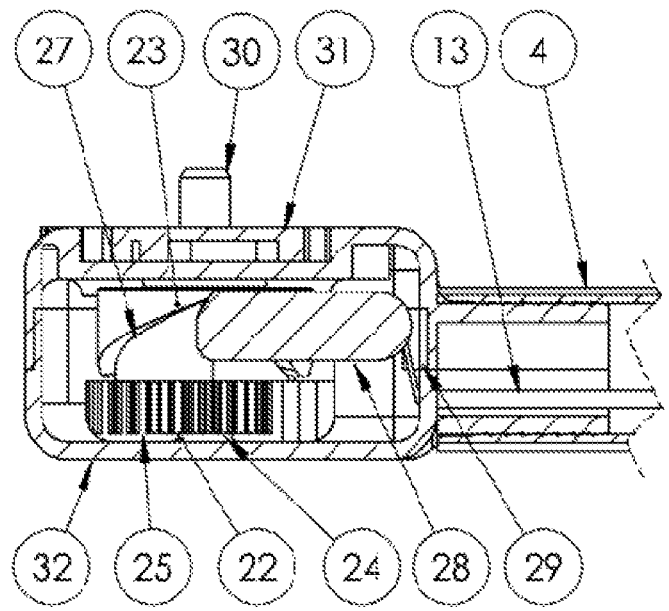
FIG. 6A shows a cross-sectional side view of another embodiment of a support assembly comprising a rotational assist device and a ratchet mechanism.
Figure 6B:
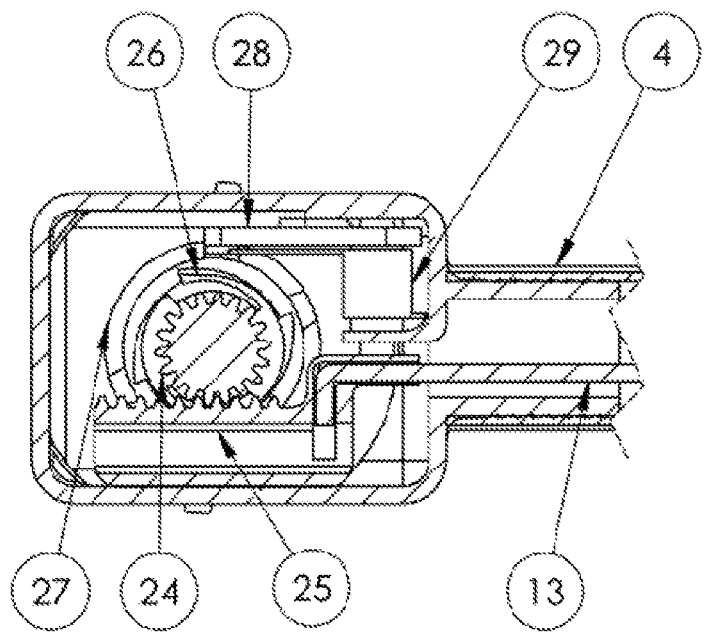
FIG. 6B shows a cross-sectional bottom view of another embodiment of a support assembly comprising a rotational assist device and a ratchet mechanism.

FIG. 6 shows another embodiment of a support assembly as provided herein. As shown in FIG. 6A, the embodiment of the support assembly (6) comprises a housing (32), a mount (23) (including a mounting screw (30) and thumb tightened nut (31)) capable of supporting a camera, a rotational member (22) comprising a pinion (24) adapted to translate actuating force from the actuator into rotational motion of the mount (23), and a rotational assist device related to that shown in FIG. 5 and described above, comprising a cam profile (27), and a follower (28) with an associated spring (29). The actuator may comprise a rack (25) attached to a rod (13), and pinion (24) may be engaged with the rack, such that actuating force, in this example linear force, from the rod (13), via rack (25), rotates the pinion (24). Pushing trigger (11) of FIG. 3 will pull rod (13) toward a user, and pulling of rod (13) in the support assembly (6) shown in FIG. 6A will result in a clockwise rotation of the pinion when viewed from the side facing the mount (23) (i.e. the top). Releasing the trigger will push rod (13) away from the user, and pushing of rod (13) in the support assembly (6) shown in FIG. 6A will result in a counter clockwise rotation (when viewed from the top side, looking down at mount (23)) of the pinion.

The mount (23) shown in FIG. 6A is disengageably coupled to the rotational member (22) via a ratchet mechanism (26), such that only clockwise rotation of the pinion (when viewed from the side facing the mount (23)) will engage the mount (23) to rotate. Counter clockwise rotation of the pinion does not engage the mount (23), which allows the rod/rack/pinion mechanism to reset to pre-actuation position following actuation of the actuator and upon release of the trigger (i.e. when the trigger (11) shown in FIG. 3 is released by the user). A bottom cross-sectional view of the support assembly of FIG. 6A is provided in FIG. 6B, which further illustrates the disengageable coupling ratchet mechanism (26).

Figure 7A:
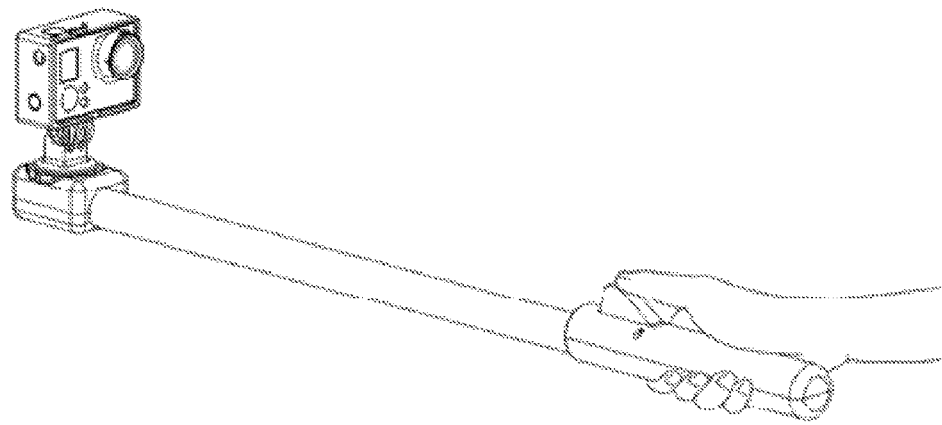
FIG. 7A shows perspective views of a user operating an embodiment of a rotatable support apparatus in a user-facing preset/stop position.
Figure 7B:
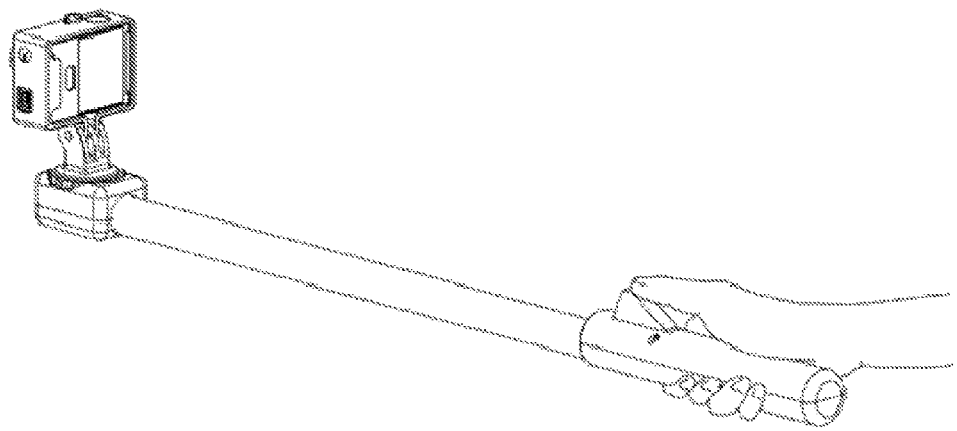
FIG. 7B shows perspective views of a user operating an embodiment of a rotatable support apparatus in a preset/stop position 180° away from the user-facing stop position.

FIG. 7 shows an example of a user operating an embodiment of a rotatable support apparatus for a camera as provided herein, such as that illustrated in any one of FIGS. 1-6. In FIG. 7(A), the user has the camera in a user-facing stop position. The user then presses the trigger, which pulls the rod transmitting an actuating force between the first end section and the second end section of the support arm, in this case along the longitudinal axis of the support arm. The actuating force, in this case a linear force, moves the rack, which is connected to the rod, causing the pinion to rotate clockwise. The pinion rotates the mount in a clockwise direction through a ratchet mechanism allowing rotation of the mount in a single direction. The pinion rotates the mount just over 60° (rise interval) when the trigger is fully pressed. The rotation of the mount slightly past 60° moves the follower to just beyond an apex of the cam profile, loading the follower spring, which provides additional rotational motion. The additional rotation motion provided by the follower contacting the cam profile rotates the mount an approximate additional 120° (return interval) such that the follower rests in a subsequent trough in the cam profile, resulting in a smooth, quick, and precise rotation of the camera about 180° to a position facing away from the user as shown in FIG. 7(B).

When the trigger is released by the user, the trigger spring element resets the trigger back up to a pre-actuation position, which pushes the rod away from the user, moving the rack to rotate the pinion counter clockwise back to a pre-actuation, reset position ready for the next actuation and rotation event. During the counter clockwise rotation of the reset motion of the pinion, the ratchet mechanism disengages the mount from the rotational member (the ratchet engages the mount during clockwise rotation but not counter clockwise rotation in this example, although these directions may be reversed if desired), and so the mount does not substantially rotate during reset in this example.

Figure 8:
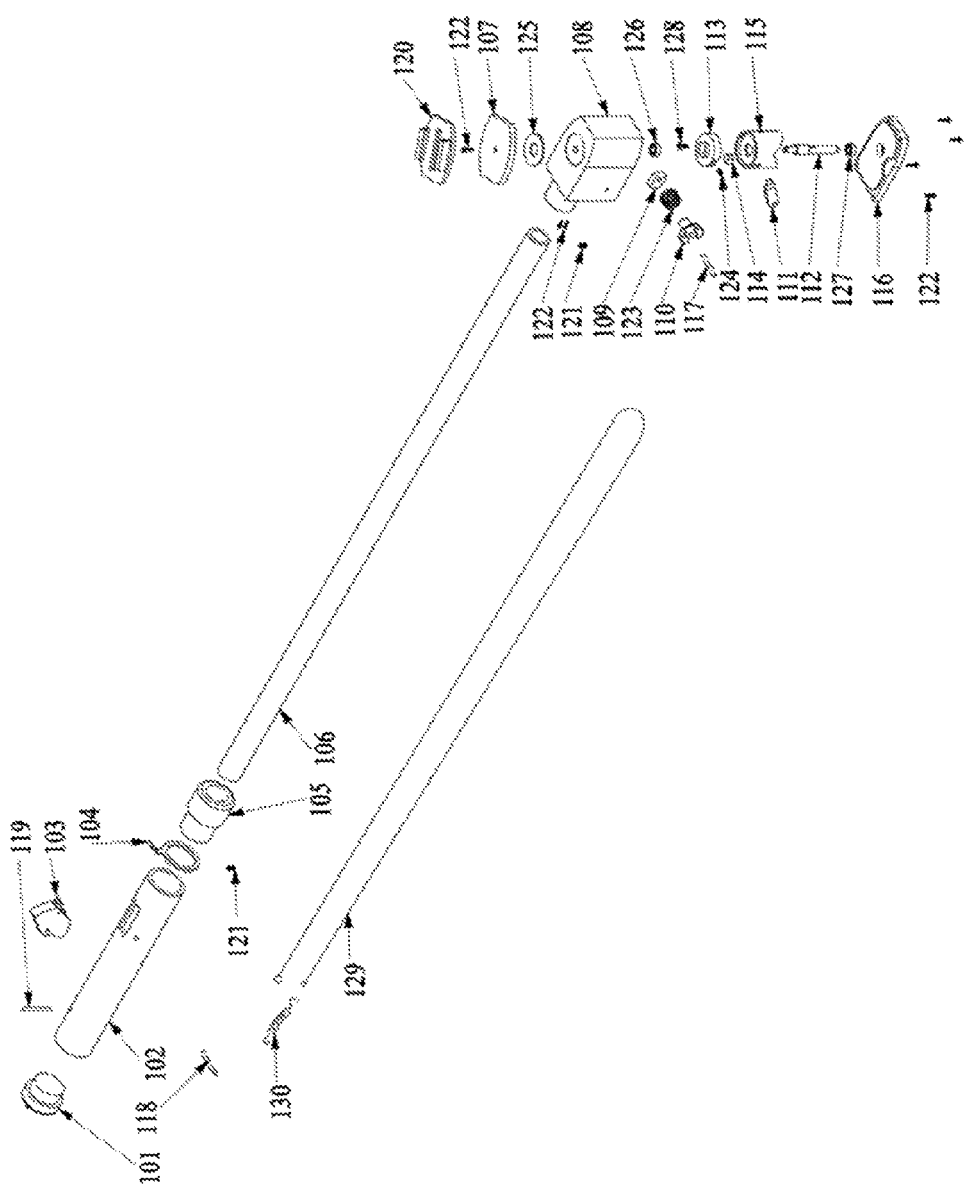
FIG. 8 shows an exploded view of an embodiment of a rotatable support apparatus for a camera.

FIG. 8 provides an exploded view of an embodiment of a rotatable support apparatus for a camera as disclosed herein. The exploded view shows the structure, and assembly connectivity, for a rotatable support apparatus for a camera.

FIG. 8 illustrates a non-limiting embodiment of a rotatable support apparatus for a camera comprising a support arm, an actuator, and a support assembly comprising a mount, a rotational member, and a rotational assist device.

The support arm of the rotatable support apparatus embodiment shown in FIG. 8 comprises rod 106, fitted with a handle/rod union member 105, a remote mount 104 and a knurled set screw 121, a handle/grip 102, and an end cap 101 at a first end.

The actuator of the rotatable support apparatus embodiment shown in FIG. 8 is positioned substantially at a first end section of the support arm, and comprises trigger 103, trigger pin 118, spring pin 119, spring 130, and a cable 129 extending from the trigger to the support assembly.

The support assembly of the rotatable support apparatus embodiment shown in FIG. 8 is attached at a second end section of the support arm, and comprises a mount, a rotational member, and a rotational assist device. The support assembly includes a housing 108 having a lid/base 116 attached by socket head cap screws 122 to the housing. The rotational member of the support assembly comprises a bearing 127 with a shaft 112 which extends from the lid/base 116. The rotational assist device, which in this example is integrated with the rotational member, comprises a cam 115 positioned on the shaft 112, and a follower 111 positioned against the cam, with a compression spring 124, a follower bushing 110, a torsion spring 123, a follower support 109, and a follower pin 117 associated with the follower. The rotational member is disengageably coupled with the mount via a ratchet mechanism, and so the rotational member further comprises a ratchet pusher 114, which is connected to the cam, and engaged with a ratchet 113 positioned above the cam. A screw 128 secures the cable 129 to the ratchet. A bearing 126 is positioned above the ratchet. The mount of the support assembly comprises a washer 125 positioned at the top of the assembly, followed by a turn table 107, secured by a socket head cap screw 122; and a buckle mount 120 is positioned above the turn table. The buckle mount is configured to support a camera. Knurled set screw 121 and socket head cap screws 122 further secure the support assembly.

It will be understood that the embodiment shown in FIG. 8 is intended as a non-limiting embodiment, and is provided simply for illustrative purposes to the person of skill in the art. It will be recognized that the parts outlined in FIG. 8, and discussed above, may be made from any suitable material including metal, plastic, polymer, rubber, or the like. At least some parts may be manufactured by injection molding in certain embodiments. Parts may be optional, or substitutable, as will be known to the person of skill in the art. Arrangement of certain parts may also be varied, as will be known to the skilled person having regard to this application.

As will be understood, parts 101-130 as shown in FIG. 8 simply represent a non-limiting embodiment of a rotatable support apparatus for a camera as disclosed herein, and it will be recognized that several additions, omissions, substitutions, modifications, variations, and alternatives are possible as will be known to the person of skill in the art having regard to this application.

Figure 9:
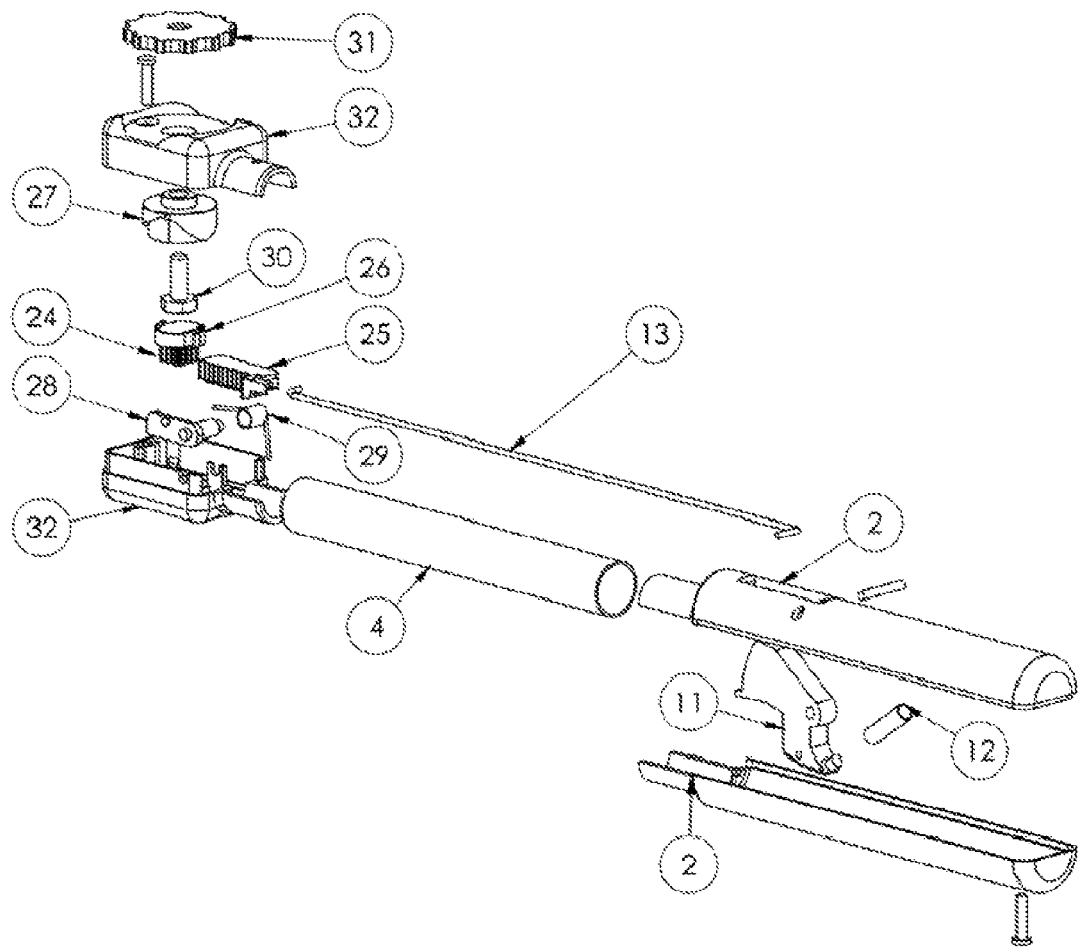
FIG. 9 shows an exploded view of another embodiment of a rotatable support apparatus for a camera.

FIG. 9 illustrates another non-limiting embodiment of a rotatable support apparatus for a camera comprising a support arm, an actuator, and a support assembly comprising a mount, a rotational member, and a rotational assist device.

The support arm (4) of the rotatable support apparatus embodiment shown in FIG. 9 comprises a pole having a first end section and a second end section, fitted with a hand grip (2) at the first end section. An actuator is installed at the first end section, comprising a trigger (11) with an associated spring (12), and a rod (13) extending to the second end section through a hollow portion of the support arm. A rack (25) is attached to the rod (13). A support assembly is fitted at the second end section, and comprises a housing (32) into which is installed a mount, a rotational member, and a rotational assist device.

The illustrated support assembly comprises a housing assembly (32), into which is installed a rotational member comprising a pinion (24). The rod (13) from the actuator is attached to a rack (25) which is engaged with the pinion. To the pinion is attached a ratchet mechanism (26), which is disengageably coupled with a mount comprising a mounting screw (30) and a thumb tightening nut (31) via a rotational assist device comprising a cam profile (27) and a follower (28) with an associated spring (29).

In the illustrated embodiment of FIG. 9, the ratchet mechanism (26) is configured such that only clockwise rotation of the rotational member will engage the mount to rotate. In the illustrated embodiment, counter clockwise rotation of the rotational member does not engage the mount to rotate, which allows the actuator/rotational member mechanism to reset to pre-actuation position following actuation and release of the actuator (i.e. when the trigger (11) shown in FIG. 3 is released by the user). The person of skill in the art will recognize that the rotational directions (clockwise, counter clockwise) may be reversed in other embodiments.

It will be understood that the embodiment shown in FIG. 9 is intended as a non-limiting embodiment, and is provided simply for illustrative purposes to the person of skill in the art. It will be recognized that the parts outlined in FIG. 9, and discussed above, may be made from any suitable material including metal, plastic, polymer, rubber, or the like. At least some parts may be manufactured by injection molding in certain embodiments. Parts may be optional, or substitutable, as will be known to the person of skill in the art. Arrangement of certain parts may also be varied, as will be known to the skilled person having regard to this application.

As will be understood, parts as shown in FIG. 9 simply represent a non-limiting embodiment of a rotatable support apparatus for a camera as disclosed herein, and it will be recognized that several additions, omissions, substitutions, modifications, variations, and alternatives are possible as will be known to the person of skill in the art having regard to this application.

It will be understood that, in certain embodiments, the actuator and/or support assembly may be provided as a kit for installation on an existing supporting arm. In one embodiment, there is provided a rotatable camera support kit, comprising an actuator for installation at a first end section of a support arm which is capable of providing an actuating force or signal between the first end section and a second end section of the support arm. The kit further comprises a support assembly for installation at the second end section of the support arm comprising a mount capable of supporting a camera and a rotational member adapted to translate the actuating force or signal from the actuator into rotational motion of the mount.

It will further be understood that, in certain embodiments, there is provided herein a support assembly for installation at a first end section of a support arm for a camera support, the support assembly comprising a mount capable of supporting a camera; and a rotational member adapted to translate an actuating force or signal into rotational motion of the mount.

The embodiments and examples outlined herein are provided for illustrative purposes, are intended for the person of skill in the art, and are not meant to be limiting in any way.

What is claimed is:

1. A rotatable camera support comprising:
a support arm member;
an actuator located at a first end section of the support arm member providing a linear actuating force from the first end section toward a second end section of the support arm member;
a support assembly positioned at the second end section of the support arm and comprising:
a mount capable of supporting the camera; and
a rotational member coupled to the mount and adapted to translate the linear actuating force into rotational motion of the mount;
wherein the mount is disengageably coupled to the rotational member to allow rotation of the mount in a single direction; and
the mount is disengageably coupled to the rotational member via a ratchet mechanism; and
the ratchet mechanism disengages the mount from the rotational member when the actuator resets between actuations to allow a linear force generated during the actuator reset to rotate the rotational member without rotating the mount.

2. The rotatable camera support according to claim 1, wherein the mount is disengageably coupled to the rotational member via a friction clutch mechanism.

3. The rotatable camera support according to claim 1, wherein the support assembly further comprises a rotational assist device capable of providing a supplemental rotational force to the mount.

4. The rotatable camera support according to claim 1, wherein the mount rotates about 180° per actuation of the actuator.

5. The rotatable camera support according to claim 1, wherein the mount rotates between a first stop position substantially facing the first end of the support arm, and a second stop position about 180° from the first stop position.

6. The rotatable camera support according to claim 1, wherein the second end section of the support arm member is displaced from the first end section along a longitudinal axis, and the rotational motion of the mount is within a plane which the longitudinal axis of the support arm member lies in.

7. The rotatable camera support according to claim 1, wherein the actuator and rotational member comprise a rack and pinion mechanism for translating the actuating force from the actuator into the rotational motion of the mount.

8. The rotatable camera support according to claim 1, wherein the actuator comprises a spring-loaded trigger.

9. The rotatable camera support according to claim 1, wherein the actuator comprises a rod, pulley, cable, chain, rope, string, or belt for providing the actuating force to the rotational member.

10. The rotatable camera support according to claim 1, wherein the actuator comprises a rod for providing the actuating force to the rotational member.

11. The rotatable camera support according to claim 1, wherein the mount comprises a mounting screw for mounting a camera.

12. The rotatable camera support according to claim 1, wherein the support arm further comprises a hand grip at the first end section of the support arm.

13. The rotatable camera support according to claim 3, wherein the rotational assist device comprises a cam profile located on the mount and a follower mechanism in contact with the cam profile, the follower mechanism urging rotation of the cam profile from a high point of the cam profile to a low point of the cam profile.

14. The rotatable camera support according to claim 13, wherein the cam profile provides two or more preset positions through which the mount can be rotated, with each of the preset positions associated with a high point and corresponding low point of the cam profile.

15. The rotatable camera support according to claim 14, wherein the two or more preset positions of the cam profile are equally distributed about a 360° rotation of the mount.

16. The rotatable camera support according to claim 14, wherein the two or more preset positions of the cam profile are unequally distributed about a 360° rotation of the mount.

17. A rotatable camera support kit, comprising:
an actuator for installation at a first end section of a support arm member providing a linear actuating force from the first end section toward a second end section of the support arm member; and
a support assembly for installation at the second end section of the support arm and comprising:
a mount capable of supporting the camera; and
a rotational member coupled to the mount and adapted to translate the linear actuating force into rotational motion of the mount; and
wherein the mount is disengageably coupled to the rotational member to allow rotation of the mount in a single direction; and
the mount is disengageably coupled to the rotational member via a ratchet mechanism; and
the ratchet mechanism disengages the mount from the rotational member when the actuator resets between actuations to allow a linear force generated during the actuator reset to rotate the rotational member without rotating the mount.

18. The rotatable camera support kit according to claim 17, further comprising the support arm member.

19. The rotatable camera support kit according to claim 17, wherein the actuating force is a linear force provided along a longitudinal axis of the support arm.

\* \* \* \* \*